United States Patent
Hoffjann et al.

(10) Patent No.: US 7,550,218 B2
(45) Date of Patent: Jun. 23, 2009

(54) APPARATUS FOR PRODUCING WATER ONBOARD OF A CRAFT DRIVEN BY A POWER PLANT

(75) Inventors: Claus Hoffjann, Hamburg (DE); Hans-Juergen Heinrich, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 1233 days.

(21) Appl. No.: 10/417,893

(22) Filed: Apr. 16, 2003

(65) Prior Publication Data

US 2004/0040312 A1 Mar. 4, 2004

(30) Foreign Application Priority Data

Apr. 16, 2002 (DE) ................................ 102 16 710

(51) Int. Cl.
- *H01M 8/04* (2006.01)
- *H01M 2/00* (2006.01)
- *F02C 6/04* (2006.01)
- *F01K 13/00* (2006.01)
- *F01K 17/00* (2006.01)
- *F01K 23/04* (2006.01)
- *F01K 23/06* (2006.01)

(52) U.S. Cl. ............................. 429/34; 429/12; 429/13; 429/26; 429/30; 60/645; 60/648; 60/655; 60/670; 60/784; 60/904

(58) Field of Classification Search .............. 429/13–26; 60/645, 648, 655, 670, 39.53, 39.182
See application file for complete search history.

(56) References Cited

U.S. PATENT DOCUMENTS 1,803,156 A * 4/1931 Wagner ........................ 165/44
3,615,839 A * 10/1971 Thompson et al. ............ 429/16

(Continued)

FOREIGN PATENT DOCUMENTS

EP 0 400 701 12/1990

(Continued)

OTHER PUBLICATIONS

Encyclopaedia Britannica . 2008. Encyclopaedia Britannica Online. Feb. 28, 2008 <http://www.search.eb.com/eb/article-9022505>.*

(Continued)

*Primary Examiner*—Dah-Wei D Yuan
*Assistant Examiner*—Katherine Turner
(74) *Attorney, Agent, or Firm*—W. F. Fasse; W. G. Fasse

(57) ABSTRACT

Water is generated onboard of a craft such as an aircraft or in a self-contained stationary system by partially or completely integrating a water generating unit into a power plant of the craft or system. The water generating unit includes one or more high temperature fuel cells which partially or completely replace the combustion chamber or chambers of the power plant. A reformer process is integrated into the high temperature fuel cell which is arranged between, on the one hand, a fan (30) and power plant compressor stages (31, 32) and, on the other hand, power plant turbine stages (33, 34). These power plant stages may be provided in such redundant numbers that safety and redundancy requirements are satisfied.

34 Claims, 1 Drawing Sheet

U.S. PATENT DOCUMENTS

| | | | |
|---|---|---|---|
| 3,773,574 A * | 11/1973 | Bridgforth et al. | 149/22 |
| 3,851,702 A * | 12/1974 | Heller et al. | 165/110 |
| 3,908,362 A * | 9/1975 | Szydlowski | 60/226.1 |
| 4,333,992 A * | 6/1982 | Healy | 429/17 |
| 4,454,207 A * | 6/1984 | Fraioli et al. | 429/17 |
| 5,858,314 A * | 1/1999 | Hsu et al. | 422/211 |
| 5,976,332 A | 11/1999 | Hsu et al. | |
| 6,001,258 A * | 12/1999 | Sluys et al. | 210/650 |
| 6,296,957 B1 * | 10/2001 | Graage | 429/12 |
| 6,316,134 B1 * | 11/2001 | Cownden et al. | 429/19 |
| 6,376,113 B1 * | 4/2002 | Edlund et al. | 429/19 |
| 6,450,447 B1 | 9/2002 | Konrad et al. | |
| 7,036,314 B2 * | 5/2006 | Hoffjann et al. | 60/645 |
| 7,208,239 B2 | 4/2007 | Hoffjann et al. | |
| 2002/0004152 A1 * | 1/2002 | Clawson et al. | 429/17 |
| 2003/0008183 A1 * | 1/2003 | Hsu | 429/13 |
| 2005/0266287 A1 | 12/2005 | Hoffjann et al. | |

FOREIGN PATENT DOCUMENTS

| | | |
|---|---|---|
| EP | 0 634 563 | 1/1995 |
| EP | 0 967 676 | 12/1999 |
| EP | 1 035 016 | 9/2000 |
| GB | 2 338 750 | 12/1999 |
| JP | 11-200888 | 7/1999 |
| WO | WO 99/35702 | 7/1999 |

OTHER PUBLICATIONS

IPDL machine translation of JP11-200888, published on Jul. 27, 1999, retrieved on Nov. 25, 2008.*

IPDL machine translation of JP 07-156892, published on Jun. 20, 1995, retrieved on Nov. 25, 2008.*

Fuel Cell Handbook, Nov. 2004, U.S. Department of Energy, Seventh Edition, p. 1-8.*

* cited by examiner

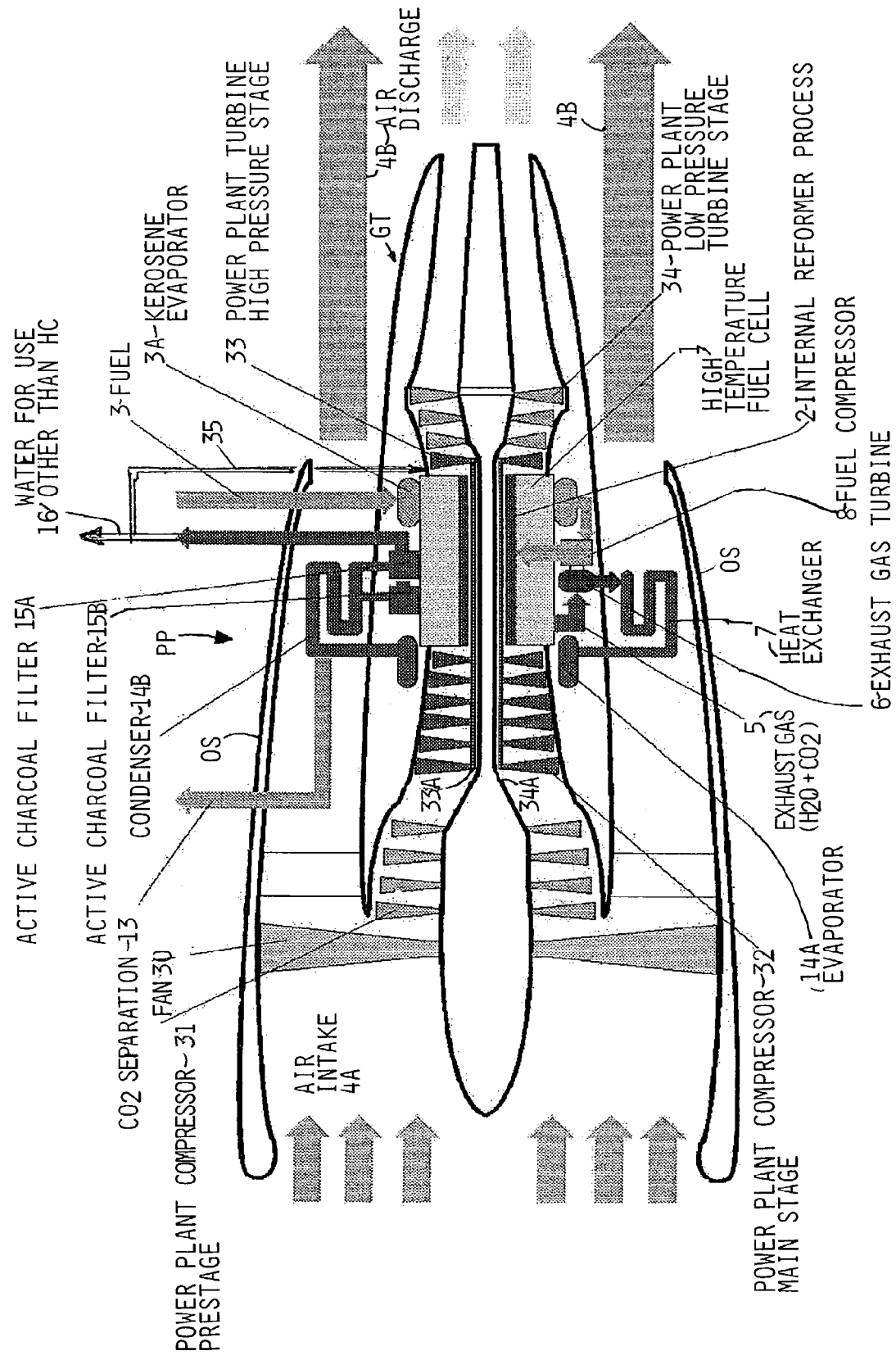

US 7,550,218 B2

APPARATUS FOR PRODUCING WATER ONBOARD OF A CRAFT DRIVEN BY A POWER PLANT

PRIORITY CLAIM

This application is based on and claims the priority under 35 U.S.C. §119 of German Patent Application 102 16 710.9, filed on Apr. 16, 2002, the entire disclosure of which is incorporated herein by reference.

FIELD OF THE INVENTION

The invention relates to an apparatus or system for producing water onboard of a craft, particularly an aircraft, by using one or more fuel cells.

BACKGROUND INFORMATION

It is possible to produce water onboard of a craft that is driven by a power plant such as a turbine. This is particularly true for aircraft, however, water may also be produced onboard of watercraft or ground vehicles such as trains and autonomous stationary units by using fuel cells or another suitable process. In order to assure the flight safety as well as the operational safety of an aircraft and to provide comfort for the passengers, it is required that certain redundancies are available. For this purpose it is necessary that the individual system components are interlocked with one another in their operation. The conventional separation between water or wastewater systems on the one hand and the climate or cabin air systems on the other hand, and the separation between energy producing systems on the one hand and hydraulic or pneumatic systems on the other hand is not practical and not advantageous where fuel cells are used.

OBJECTS OF THE INVENTION

It is the purpose of the invention to provide an apparatus for producing water onboard of a craft, particularly an aircraft by optimally utilizing the fuel cell technology and by assuring the respective or required redundancies for the craft, particularly an aircraft. Further, the invention also assures the satisfaction of safety requirements that are subject to government regulations.

SUMMARY OF THE INVENTION

The above objects have been achieved according to the invention by an apparatus for producing water onboard of a craft driven by a power plant, whereby the apparatus is characterized by at least one high temperature fuel cell integrated at least partially into the power plant as a water and heat generating unit. The at least one high temperature fuel cell is at least partly replacing a conventional combustion chamber or chambers of the power plant. By constructing the high temperature fuel cell or fuel cells in such a manner that it replaces the combustion chamber of the power plant at least in part, a weight reduction is achieved as well as a flexibility in the distribution of the produced water that has a high quality and that can be produced in sufficient volume while simultaneously reducing the volume of waste water. Yet another advantage is seen in a substantially reduced output of harmful components in the exhaust gases of the power plant due to a higher efficiency of the combination in the high temperature fuel cell processes integrated with the gas turbine process. Another very important advantage is seen in the reduction of the fuel consumption in the combined process of a high temperature fuel cell with the gas turbine operation. The use of the fuel cell exhaust gases for the water generation also contributes to the efficient fuel consumption. Ideally, only $CO_2$ and water vapor are produced as an exhaust gas of the high temperature fuel cell. Another advantage of the invention is seen in that the at least partial use of the water contained in the exhaust gas of the fuel cells reduces the formation of condensate or vapor trails in high altitude atmosphere layers. As a result, the formation of high altitude streak clouds is also reduced. If one applies such an exhaust gas reduction to all aircraft aloft, one achieves an additional reduction of condensation seeds in the exhaust gas. Such condensation seeds are conventionally produced by incomplete combustion processes. By replacing the conventional combustion chamber or chambers of a power plant by one or more high temperature fuel cells, the invention achieves a substantial reduction in the production of condensates in the atmosphere by aircraft exhaust gases.

BRIEF DESCRIPTION OF THE DRAWINGS

In order that the invention may be clearly understood, it will now be described, by way of example, with reference to the single FIGURE of the accompanying drawing which illustrates schematically the integration of a high temperature fuel cell into a gas turbine power plant.

DETAILED DESCRIPTION OF A PREFERRED EXAMPLE EMBODIMENT AND OF THE BEST MODE OF THE INVENTION

According to the invention water is produced onboard of a craft, particularly an aircraft, by integrating a high temperature fuel cell 1 into a fuel-oxidizing and air-heating section of a conventional power plant PP comprising a gas turbine GT with several stages, including a low pressure turbine stage 34 and a high pressure turbine stage 33. For generating water and hot air or gas for the turbine GT, the combustion chamber of the turbine has been replaced according to the invention by the high temperature fuel cell 1 into which an internal fuel reformer process 2 is integrated. Air 4A is sucked into the power plant PP through a compressor including a compressor prestage 31 and a compressor main stage 32. The turbine stages 33 and 34 are coupled with the compressor stages 31 and 32. More specifically, the high pressure turbine stage 33 is coupled through a shaft coupling 33A with the main compressor stage 32. The low pressure turbine stage 34 is coupled through a shaft coupling 34A to the compressor prestage 31. The coupling 34A also carries the power plant fan 30. Air that has passed through the power plant and through the high temperature fuel cell 1 is ejected downstream of the gas turbine GT as shown by the unnumbered small arrows, while the large arrows 4B identify bypass air blown by the fan 30 past the gas turbine GT. The rotational energy produced by the power plant including the compressor turbine combination and high temperature fuel cell is transferred to the fan 30 which produces the bypass air 4B as the main component of the thrust of the power plant PP. The fan 30 is coupled to the low pressure turbine stage 34 by the coupling 34A.

According to the invention, as a fuel-oxidizing and air-heating section of the turbine engine, the combustion chamber of the conventional compressor turbine combination is replaced at least partially or completely by one or more high temperature fuel cells operating, preferably at a temperature of above 500° C. Such fuel cells are conventionally available as solid oxide fuel cells (SOFC) or as molten carbonate fuel cells (MCFC) or any other high temperature fuel cells having characteristics comparable to SOFCes or MCFCes.

According to the invention and depending on the principle employed, the so-called air side, that is the oxygen supply side of the fuel cell is separated from the fuel side of the fuel cell, namely the hydrogen supply side of the fuel cell. Thus, the fuel cell 1 receives air 4A or a source of oxygen at its left hand end and fuel such as kerosene at its right hand end.

The air 4A flows through the power plant PP in the thrust direction, namely from the intake side at 4A to the exhaust side from left to right in the drawing. The air is compressed in the compressor stages 31 and 32 and passed into the high temperature fuel cell or fuel cells 1. The fuel cell 1 heats the air by heat evolved in an oxidation process in which the fuel is oxidized, whereby the oxygen component is withdrawn from the air to the extent necessary for the operation of the high temperature fuel cell 1. The thus heated air is then expanded in the turbine stages 33, 34 of the turbine of the power plant PP. The obtained energy is thereby converted in the several turbine stages into rotational energy and the energy is supplied to the compressor stages 31 and 32 and to the fan 30 of the power plant PP in order to suck new air into the system and to produce the required thrust.

The fuel 3, normally kerosene, is first emulsified with gray water and then evaporated in the evaporator 3A which feeds its evaporate into the high temperature fuel cell 1. The internal reformer process 2 separates the hydrogen out of the fuel mixture of air, kerosene and water. The fuel cell 1 uses the hydrogen to the extent necessary, thereby oxidizing the hydrogen to water which is then present in the fuel cell in the form of water vapor. The carbon components present in the fuel are oxidized to form $CO_2$ which is extracted from the exhaust gas at a suitable point 13 that is preferably downstream of the first and/or second condensation stage or stages, preferably including several stages such as an exhaust gas turbine 6, a heat exchanger 7, an evaporator 14A and a condenser 14B from which the $CO_2$ is separated at 13.

The produced water vapor is partially exhausted into the turbine stages 33, 34 section in order to convert the energy present in the water vapor into rotational energy. A smaller portion of this water vapor is condensed into water in the heat exchanger 7 which receives the water vapor through the exhaust gas turbine 6 receiving the exhaust gas 5 from the fuel cell 1. In order to separate any harmful components possibly still present in the water condensed from the water vapor, the water is subjected to a further treatment by passing it through the evaporator condenser process 14A and 14B which assures a second distillation. The resulting water is then filtered through active charcoal filters 15A and 15B. The evaporator 14A is operated with process heat from the fuel cell 1. Similarly, the active charcoal of the filters 15A, 15B is regenerated with process heat from the fuel cell 1 at a temperature level which assures that any germs in the generated water are killed Preferably two charcoal filters 15A and 15B are alternately used for filtering the water and regenerated with the fuel cell process heat. Downstream of the charcoal filters 15A and 15B, a further condensation may be used for reducing the temperature of the generated water 16.

A fuel compressor 8 is driven by the exhaust gas turbine 6 and receives its fuel input from the fuel evaporator 3A that is preferably formed as a ring surrounding the fuel cell 1 so that the process heat of the fuel cell 1 preheats or evaporates the fuel gray water mixture preferably reaching the fuel evaporator 3A as an emulsion.

The present exhaust gas system comprising the above mentioned exhaust gas turbine 6 is connected in series between the exhaust gas output 5 of the fuel cell 1 and the heat exchanger 7 which condenses the water out of the fuel cell exhaust gas. The heat exchanger 7 feeds the water into the evaporator 14A which in turn feeds the evaporate or water vapor into the condenser 14B leading into the active charcoal filters 15A, 15B.

According to the invention the high temperature fuel cell or fuel cells 1 are constructed for accepting pressurized air and oxygen on one side and for accepting evaporated fuel 3 including hydrogen on the respective other side as shown in the drawing. Preferably, the evaporated fuel is also compressed by the fuel compressor 8 driven by the exhaust gas turbine 6.

As mentioned, the fuel supply 3 preferably includes an emulsifier which mixes, for example kerosene and water such as gray water or a fresh water component. The fuel evaporator 3A receives the emulsified fuel and supplies its output to the internal reformer process 2 arranged downstream of the evaporator inside the fuel cell 1. Preferably, the evaporator 3A is operated by process heat of the fuel cell 1, whereby the shown arrangement of the evaporator 3A as a ring around the fuel cell 1 is advantageous and efficient.

The single FIGURE also shows the fuel compressor 8 for providing the fuel under pressure into the high temperature fuel cell 1. As mentioned above, this fuel compressor 8 is driven by the exhaust gas turbine 6 and receives evaporated fuel emulsion from the fuel evaporator 3A.

The compressor stages 31, 32 of the power plant PP or a separate compressor driven by the power plant may be provided for supplying pressurized air to the system, for example for start up. In that case the pressurized air may be stored in a suitable container. Similarly, a separate compressor may be provided for operating the pumps of a hydraulic system in the craft or self-contained unit.

The above mentioned heat exchanger 7 which receives exhaust gas from the fuel cell 1 through the exhaust gas turbine 6, is positioned in an airstream 4A of the power plant PP. Preferably, the heat exchanger 7 is positioned along an outer skin OS in the bypass airstream flow of the power plant. The exhaust gas or water evaporator 14A and the condenser 14B are arranged in series with and downstream of the exhaust gas expanding and condensing system 6, 7. The exhaust gas evaporator 14A is positioned proximate to the high temperature fuel cell 1, preferably in a ring form for at least partially surrounding the high temperature fuel cell 1, so that the evaporator 14A can be operated by process heat from the high temperature fuel cell 1. The condenser 14B is also arranged in the airstream 4A of the power plant PP, preferably in the bypass air flow along an outer skin OS of the power plant.

The FIGURE further shows the $CO_2$ extractor 13 connected to the exhaust gas condensing system, preferably to the condenser 14B.

The above mentioned charcoal filters 15A and 15B are arranged downstream of the exhaust gas evaporator 14A and also downstream of the condenser 14B. Preferably at least two active charcoal filters 15A and 15B are arranged in such a position that they can be operated by the process heat of the high temperature fuel cell 1 for regenerating the active charcoal in the filters 15A, 15B.

A fresh water discharge 16 is connected alternately to at least one of the two charcoal filters which may be connected in parallel with one another to the condenser 14B. A branch line or controllable conduit 35 is connected to the water discharge 16 for supplying a portion of the distilled quality water to the power plant PP upstream of the turbine stages 33, 34 of the power plant, whereby distilled water is fed into the heated airstream passing through the turbine stages.

The drawing also shows that the high pressure turbine stage 33 is coupled through the shaft coupling 33A to the main compressor stage 32. The low pressure stage 34 of the power plant or turbine is coupled through the shaft coupling 34A to the precompressor stage 31 also referred to as a supercharger compressor stage 31. The fan 30 is also connected through the coupling 34A to the low pressure stage 34 of the turbine. With this arrangement the compressor stages 31, 32 supply pressurized air or oxygen to one side of the high temperature fuel cell 1 while the fan 30 generates thrust. The fuel 3 is supplied to the opposite side of the fuel cell. However, it should be noted that the fuel cell 1 can be constructed for operation without any compressor or compressors. Further, the power plant PP can be constructed for starting in response to a supply of pressurized or compressed air provided from a separate compressor or stored in a respective pressurized container.

With the help of the above mentioned couplings 33A and 34A the compressor main stage 32 and the high pressure turbine 33 are rotatable with a reduced r.p.m. for supplying air and cooling to the high temperature fuel cell while the fan 30, the supercharger or precompressor stage 31, and the low pressure turbine stage 34 are subjected to a brake action.

The FIGURE also shows that at least one high temperature fuel cell 1 with its integrated internal reformer process 2 is arranged to surround the above mentioned couplings 33A and 34A between the turbine stages 33, 34 on the right hand side and the fan 30 and compressor stages 31, 32 on the left hand side of the fuel cell 1.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An aircraft turbofan engine comprising a compressor, a turbine, a thrust-producing bypass fan, at least one coupling shaft that interconnects said compressor, said turbine, and said thrust-producing bypass fan, a fuel oxidizer section that is interposed in a gas flow passage between said compressor and said turbine, and a condenser arrangement adapted to output water out of said aircraft turbofan engine at a water outlet thereof, wherein:
    said fuel oxidizer section has an air inlet facing toward said compressor in said gas flow passage and adapted to take in compressed air from said compressor, a fuel inlet adapted to take in a fuel that includes at least one fuel component suitable to be oxidized in at least one oxidation process using the fuel and the compressed air in said fuel oxidizer section, and a hot gas outlet facing toward said turbine in said gas flow passage and adapted to output a hot gas produced with heat from the at least one oxidation process; and
    said fuel oxidizer section includes at least one high temperature fuel cell incorporated therein, wherein said fuel cell has a fuel side of said fuel cell connected to said fuel inlet, an air side of said fuel cell integrated in said gas flow passage between said air inlet and said hot gas outlet, and a fuel cell exhaust outlet connected to an inlet of said condenser arrangement.

2. An aircraft turbofan engine comprising a compressor, a turbine, a thrust-producing bypass fan, at least one coupling shaft that interconnects said compressor, said turbine, and said thrust-producing bypass fan, a fuel oxidizer section that is interposed in a gas flow passage between said compressor and said turbine, and a condenser arrangement adapted to output water out of said aircraft turbofan engine at a water outlet thereof, wherein:
    said fuel oxidizer section has an air inlet facing toward said compressor in said gas flow passage and adapted to take in compressed air from said compressor, a fuel inlet adapted to take in a fuel that includes at least one fuel component suitable to be oxidized in at least one oxidation process using the fuel and the compressed air in said fuel oxidizer section, and a hot gas outlet facing toward said turbine in said gas flow passage and adapted to output a hot gas produced with heat from the at least one oxidation process;
    said fuel oxidizer section includes at least one high temperature fuel cell incorporated therein, wherein said fuel cell has a fuel side of said fuel cell connected to said fuel inlet, an air side of said fuel cell integrated in said gas flow passage between said air inlet and said hot gas outlet, and a fuel cell exhaust outlet connected to an inlet of said condenser arrangement;
    the at least one oxidation process includes a high temperature fuel cell process to be carried out in said at least one high temperature fuel cell, wherein the fuel is to be oxidized with oxygen extracted from the compressed air, the compressed air is to be heated with heat evolved from the high temperature fuel cell process and is to be output as the hot gas through said hot gas outlet, and a fuel cell exhaust containing oxidized fuel components is to be output through said fuel cell exhaust outlet; and
    said condenser arrangement is adapted to condense the fuel cell exhaust and produce the water at said water outlet.

3. The aircraft turbofan engine according to claim 2, wherein said fuel oxidizer section further includes at least one combustion chamber, wherein the at least one oxidation process further includes a combustion process to be carried out in said at least one combustion chamber wherein the fuel and the compressed air are combusted together to form hot combustion exhaust gas to be output together with the heated compressed air as the hot gas through said hot gas outlet.

4. The aircraft turbofan engine according to claim 2, not including any combustion chamber.

5. An apparatus for producing water in an aircraft turbofan engine system,
    comprising a turbine engine, at least one high temperature fuel cell integrated as a water generating unit into said turbine engine, and an exhaust gas condensing system (6, 7) coupled to an exhaust gas discharge (5) of said high temperature fuel cell (1) and adapted to condense the water out of exhaust gas of said high temperature fuel cell (1),
    wherein said turbine engine comprises a compressor, a turbine, a bypass fan, at least one coupling shaft interconnecting said compressor, said turbine and said bypass fan, and a fuel-oxidizing air-heating section interposed between said compressor and said turbine,
    wherein said at least one high temperature fuel cell is incorporated in said fuel-oxidizing air-heating section, and
    wherein said exhaust gas condensing system comprises a heat exchanger (7), and an exhaust gas turbine (6) that has a turbine inlet thereof connected to said exhaust gas discharge (5) of said high temperature fuel cell and that has a turbine outlet thereof connected to said heat exchanger (7).

6. An apparatus for producing water in an aircraft turbofan engine system, comprising a turbine engine, at least one high temperature fuel cell integrated as a water generating unit into said turbine engine, and an exhaust gas condensing system coupled to an exhaust gas discharge (5) of said high temperature fuel cell (1) and adapted to condense the water out of exhaust gas of said high temperature fuel cell (1), and an exhaust gas turbine (6) connected in series between said exhaust gas discharge (5) of said high temperature fuel cell (1) and said exhaust gas condensing system, wherein said turbine engine comprises a compressor, a turbine, a bypass fan, at least one coupling shaft interconnecting said compressor, said turbine and said bypass fan, and a fuel-oxidizing air-heating section interposed between said compressor and said turbine, wherein said at least one high temperature fuel cell is incorporated in said fuel-oxidizing air-heating section, and wherein said exhaust gas turbine (6) forms a stage adapted to condense the water out of the exhaust gas.

7. The apparatus of claim 6, further comprising a fuel compressor (8) adapted to provide fuel under pressure into said high temperature fuel cell (1), and wherein said exhaust gas turbine (6) is coupled to said fuel compressor (8) so as to drive said fuel compressor (8) by said exhaust gas turbine (6).

8. The apparatus of claim 6, wherein said exhaust gas condensing system comprises a heat exchanger (7) forming at least a stage of said exhaust gas condensing system.

9. The apparatus of claim 8, wherein said heat exchanger (7) is arranged in an airstream (4A) of said turbine engine.

10. The apparatus of claim 8, wherein said heat exchanger (7) is arranged in an airstream flow along an outer skin (OS) of said turbine engine.

11. An apparatus for producing water in an aircraft turbofan engine system, comprising a turbine engine, at least one high temperature fuel cell integrated as a water generating unit into said turbine engine, an exhaust gas condensing system (6, 7) coupled to an exhaust gas discharge (5) of said high temperature fuel cell (1) and adapted to condense the water out of exhaust gas of said high temperature fuel cell (1), and an exhaust gas evaporator (14A) and a condenser (14B) arranged in series with and downstream of said exhaust gas condensing system (6, 7), wherein said turbine engine comprises a compressor, a turbine, a bypass fan, at least one coupling shaft interconnecting said compressor, said turbine and said bypass fan, and a fuel-oxidizing air-heating section interposed between said compressor and said turbine, and wherein said at least one high temperature fuel cell is incorporated in said fuel-oxidizing air-heating section.

12. The apparatus of claim 11, wherein said exhaust gas evaporator (14A) is positioned thermally coupled to said high temperature fuel cell (1) so as to heat said exhaust gas evaporator (14A) with process heat from said high temperature fuel cell (1).

13. The apparatus of claim 11, wherein said exhaust gas evaporator (14A) has a ring configuration surrounding said high temperature fuel cell (1).

14. The apparatus of claim 11, wherein said condenser (14B) is arranged in an airstream (4A) of said turbine engine.

15. The apparatus of claim 11, wherein said condenser (14B) is arranged in an airstream flowing along an outer skin (OS) of said turbine engine.

16. The apparatus of claim 11, further comprising a $CO_2$-extractor (13) coupled to said exhaust gas condensing system.

17. The apparatus of claim 11, further comprising a $CO_2$-extractor (13) connected to said condenser (14B).

18. The apparatus of claim 11, further comprising at least one active charcoal filter (15A, 15B) connected and arranged downstream of said exhaust gas evaporator (14A) and downstream of said condenser (14B).

19. The apparatus of claim 18, wherein said at least one active charcoal filter (15A, 15B) is arranged thermally coupled to said high temperature fuel cell (1) so that process heat of said high temperature fuel cell (1) can regenerate said at least one active charcoal filter.

20. The apparatus of claim 19, further comprising a water discharge (16) that is connected to said at least one active charcoal filter, and wherein said apparatus is adapted to discharge distilled quality water through said water discharge.

21. The apparatus of claim 20, further comprising a conduit (35) adapted to supply a portion of said distilled quality water into a heated airstream passing through said turbine.

22. An apparatus for producing water in an aircraft turbofan engine system, comprising a turbine engine, at least one high temperature fuel cell integrated as a water generating unit into said turbine engine, and a fuel supply adapted to supply to said high temperature fuel cell, through a fuel inlet (3), a fuel mixture having gray water admixed to a fuel, wherein said turbine engine comprises a compressor, a turbine, a bypass fan, at least one coupling shaft interconnecting said compressor, said turbine and said bypass fan, and a fuel-oxidizing air-heating section interposed between said compressor and said turbine, wherein said at least one high temperature fuel cell is incorporated in said fuel-oxidizing air-heating section, wherein said fuel inlet comprises a fuel evaporator (3A) arranged and adapted to evaporate said fuel mixture, wherein said fuel evaporator (3A) is thermally coupled to said high temperature fuel cell (1) so as to heat said fuel evaporator (3A) by process heat from said high temperature fuel cell (1), and wherein said apparatus further comprises an internal reformer (2) incorporated in said fuel cell (1) positioned downstream of said fuel evaporator (3A).

23. The apparatus of claim 22, wherein said fuel evaporator (3A) has a ring configuration surrounding said high temperature fuel cell (1).

24. An apparatus for producing water in an aircraft turbofan engine system, comprising a turbine engine, at least one high temperature fuel cell integrated as a water generating unit into said turbine engine, and a fuel supply adapted to supply to said high temperature fuel cell, through a fuel inlet (3), a fuel mixture having gray water admixed to a fuel, wherein said turbine engine comprises a compressor, a turbine, a bypass fan, at least one coupling shaft interconnecting said compressor, said turbine and said bypass fan, and a fuel-oxidizing air-heating section interposed between said compressor and said turbine, wherein said at least one high temperature fuel cell is incorporated in said fuel-oxidizing air-heating section, wherein said fuel inlet comprises a fuel evaporator (3A) arranged and adapted to evaporate said fuel mixture, wherein said apparatus further comprises an internal reformer (2) incorporated in said fuel cell (1) positioned downstream of said fuel evaporator, and wherein said apparatus further comprises a fuel compressor (8) arranged downstream and in series with said fuel evaporator (3A).

25. The apparatus of claim 24, further comprising an exhaust gas turbine (6) connected to an exhaust gas outlet of said fuel cell and mechanically coupled to said fuel compressor so as to drive said fuel compressor (8).

26. An apparatus for producing water in an aircraft turbofan engine system,
comprising a turbine engine and at least one high temperature fuel cell integrated as a water generating unit into said turbine engine,
wherein said turbine engine comprises a compressor, a turbine, a bypass fan, at least one coupling shaft interconnecting said compressor, said turbine and said bypass fan, and a fuel-oxidizing air-heating section interposed between said compressor and said turbine,
wherein said at least one high temperature fuel cell is incorporated in said fuel-oxidizing air-heating section,
wherein said compressor comprises a supercharger compressor stage (31) and a compressor main stage (32),
wherein said turbine comprises a high pressure turbine stage (33) and a low pressure turbine stage (34), and
wherein said compressor main stage (32) and said high pressure turbine stage (33) remain rotatable with a reduced rotational speed so as to supply cooling air to said high temperature fuel cell (1) when said bypass fan (30), said supercharger compressor stage (31) and said low pressure turbine stage (34) are subjected to braking.

27. The apparatus of claim 26, wherein said fuel-oxidizing air-heating section further includes a combustion chamber.

28. The apparatus of claim 26, wherein said fuel-oxidizing air-heating section does not include a combustion chamber.

29. The apparatus of claim 26, wherein said at least one high temperature fuel cell (1) is at least one of a solid oxide fuel cell, a molten carbonate fuel cell, and a fuel cell having a power and temperature level at least as high as those of said solid oxide fuel cell or said molten carbonate fuel cell.

30. The apparatus of claim 26, further comprising an exhaust gas condensing system (6, 7) coupled to an exhaust gas discharge (5) of said high temperature fuel cell (1) and adapted to condense the water out of exhaust gas of said high temperature fuel cell (1).

31. The apparatus of claim 26, further comprising a fuel supply adapted to supply to said high temperature fuel cell, through a fuel inlet (3), a fuel mixture having gray water admixed to a fuel.

32. The apparatus of claim 31, wherein said fuel inlet comprises a fuel evaporator (3A) arranged and adapted to evaporate said fuel mixture, and said apparatus further comprises an internal reformer (2) incorporated in said fuel cell (1) positioned downstream of said fuel evaporator (3A).

33. The apparatus of claim 26, wherein said bypass fan (30) is arranged on a side of said compressor opposite said turbine and is connected by a shaft of said at least one coupling shaft to said turbine such that said turbine can rotationally drive said bypass fan to generate thrust.

34. The apparatus of claim 26, wherein said at least one high temperature fuel cell is or are arranged on a circumference around said at least one coupling shaft.

* * * * *